Feb. 18, 1941.    M. V. HITT ET AL    2,231,911
WORM MIXER
Filed Oct. 19, 1939    2 Sheets-Sheet 1

Inventors
Maurice V. Hitt
Gordon R. McCormick
By R. F. Miller.
Attorney

Feb. 18, 1941. M. V. HITT ET AL 2,231,911
WORM MIXER
Filed Oct. 19, 1939 2 Sheets-Sheet 2
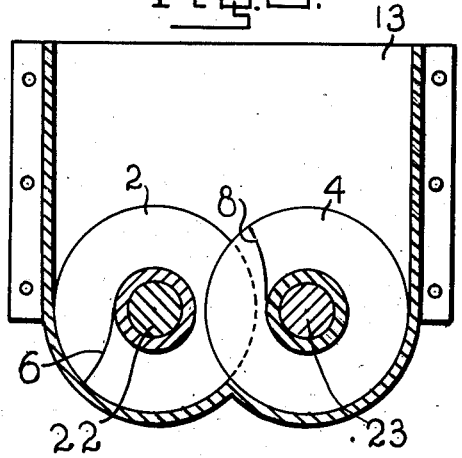
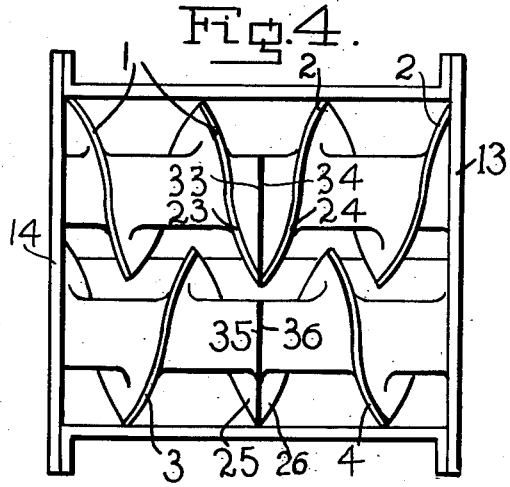
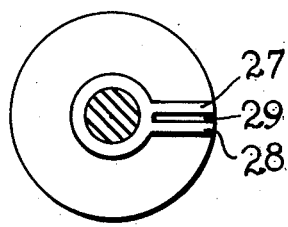
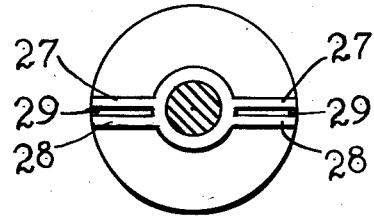
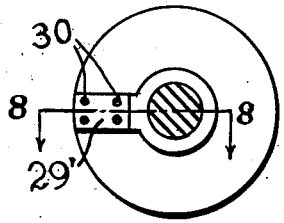
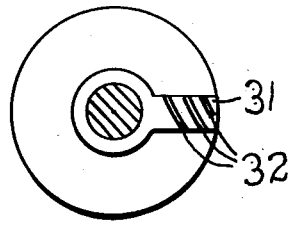
Inventors
Maurice V. Hitt
Gordon R. McCormick
By R. F. Miller
Attorney Patented Feb. 18, 1941

2,231,911

UNITED STATES PATENT OFFICE 2,231,911

WORM MIXER

Maurice V. Hitt, Wilmington, Del., and Gordon R. McCormick, Flint, Mich., assignors to E. I. du Pont de Nemours & Company, Wilmington, Del., a corporation of Delaware Application October 19, 1939, Serial No. 300,252

1 Claim. (Cl. 259—104)

The invention relates to mixing machines and more particularly to apparatus for handling heavy and viscous mixtures.

This invention is an improvement over the mixing apparatus described in application Serial No. 249,116 filed January 3, 1939. In mixing highly viscous materials and particularly in pigment-vehicle compositions the present invention presents several important additional advantages which will be pointed out more fully hereinafter.

This invention has as an object a new and improved mixing apparatus. A further object is a companion worm mixing apparatus capable of more vigorous mixing action in a shorter time than the previous mixing machines of the two worm type. A further object is a mixing apparatus of this kind which is more efficient in self-cleaning action. Other objects will appear hereinafter.

These objects are accomplished by the apparatus shown in the accompanying drawings in which Fig. 1 is an isometric view with parts broken away of a mixing machine embodying our invention;

Fig. 3 is a section taken on the line 3—3 of Fig. 2;

Fig. 4 is a plan view of a modified worm construction;

Figs. 5 to 7 show details of worm ends of different construction,

Fig. 8 is a section taken on the line 8—8 of Fig. 7,

Fig. 9 shows a further form of worm end construction.

Figure 1:
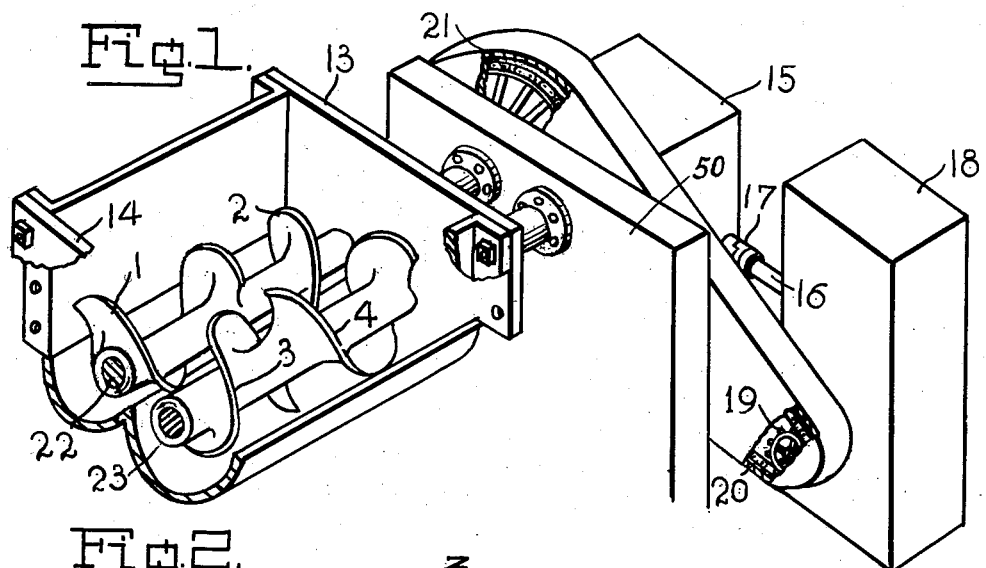
Figure 2:
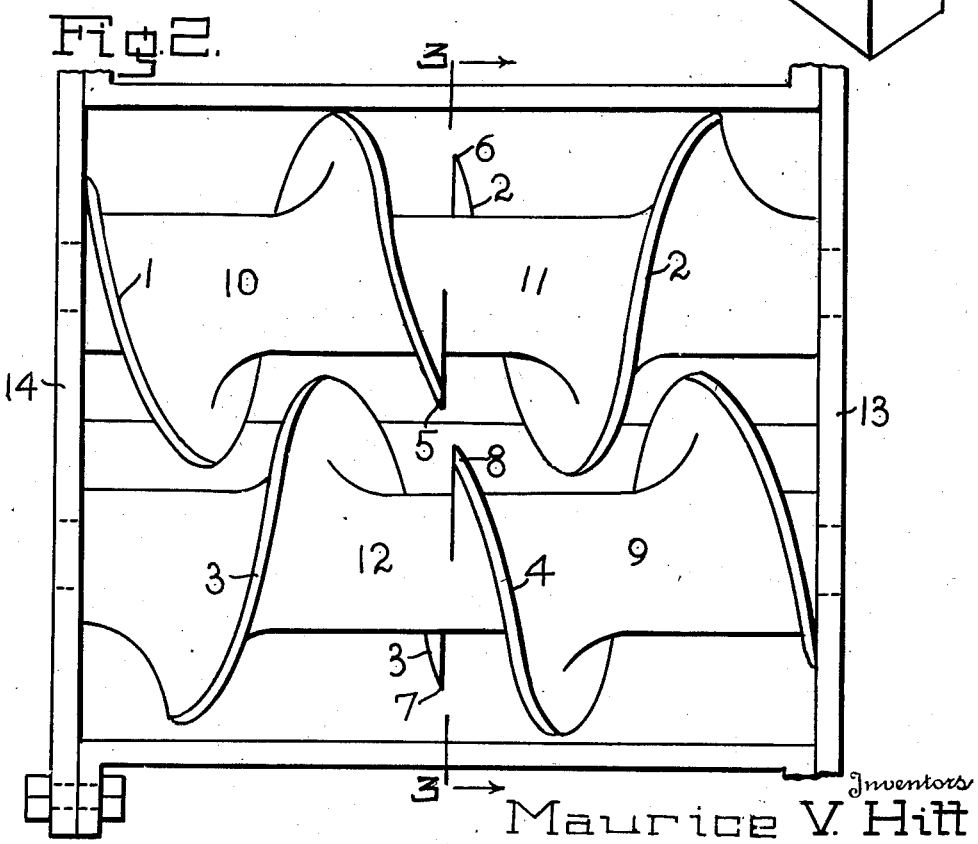
Fig. 2 is a plan view of the mixing worms shown in Fig. 1.

Referring to Figs. 1 to 2, each of the companion worms on our improved mixing apparatus is provided with two worm spirals of opposite pitch having their origins near the center of the worm, these two worm spirals on one worm being indicated by the numerals 1 and 2, and on the other worm by the numerals 3 and 4. In the arrangement illustrated the worm spiral 1 from its origin or end 5 travels clockwise to the end of the worm and the worm spiral 2 from its origin or end 6 at the side of the worm opposite 5 travels counterclockwise to the other end of the worm. On the companion worm of similar construction the worm spiral 3 is of pitch opposite to that of worm spiral 1, and worm spiral 4 is of pitch opposite to that of worm spiral 2. The worm spiral 4 (disregarding the gap between the worm ends 5 and 8) is a continuation of worm spiral 1. Similarly worm spiral 3 appears as a continuation of worm spiral 2 when the worms are rotated to bring the worm ends 6 and 7 adjacent.

Each of the worms is conveniently made in two sections, one of right hand thread and the other of left hand thread, fastened to the common shaft by suitable means such as set by screws or keys. In this way the relative position of the two sections of each worm may be varied for experimental purposes. The adjoining ends of the sections are shown by the lines 33, 34, 35 and 36 in Fig. 4.

In the above described construction when the worms are rotated in opposite directions toward each other the material being mixed is carried from the center toward each end of the mixer.

The worms shown in Fig. 4 are of similar construction and operation but differ in that the origin of the spirals, that is worm ends 23 and 24, are adjacent as are the worm ends 25 and 26. Each pair of these worm ends are on opposite sides of their respective worms as shown.

It will be observed also that through the above construction the worm spirals intermesh during rotation of the worms. Thus, in Figs. 1 and 2 when the worms move toward each other the worm end 5 passes to the left of worm end 8 so that worm spiral 1 travels within the space 12 of worm spiral 3. Likewise worm spiral 4 travels within the space 11 between the turns of worm spiral 2. The spiral 2 will similarly travel within the space 9 of the worm spiral 4 and the spiral 3 within the space 10 of worm spiral 1. In Fig. 4 the operation is similar since the spiral ends 23 and 24 will rotate within the space between spirals 3 and 4 on the companion worm and the worm ends 25 and 26 will rotate within the space between the spirals 1 and 2.

The worms are rotatably mounted in a vessel or tank the ends 13 and 14 of which are, in the case of very stiff plastic bases, spaced about one sixteenth of an inch from the worm ends and provide extrusion plates against which the material being mixed is wiped under high pressure from the end of one worm toward the end of the adjacent worm. In the case of softer pastes the clearance is smaller, the range of adjustment being usually from one sixty fourth to one sixteenth of an inch clearance. The bottom of the vessel is formed into two troughs extending under and along the worms as shown.

The worms are rotated by a motor 15 which by means of shaft 16 and clutch 17 drives suitable reduction gearing in the housing 18 from which the sprocket 19 is driven. The chain 20 connects the sprocket 19 with the larger sprocket 21 rigid with one of the worm shafts 22 which pass through the member 50 comprising a part of the supporting structure. The worm shafts 22 and 23 are rigid with the worms. The worms are driven at the same speed in the opposite direction by means of spur gears not shown which connect the two worm shafts. The worm shafts are rotatably mounted in conventional manner in the end plates 13 and 14.

The worm ends may, if desired, be formed with specially shaped extrusion ends described in the above mentioned application. Thus the spirals at the worm ends may terminate in a portion of zero pitch on which is an extrusion member or plate which may take one of the several forms shown in Figs. 5 to 8. In Fig. 5 the extrusion plate is grooved at 29 and presents two ribs or extrusion surfaces 27 and 28. In Fig. 6 two such extrusion plates are provided on opposite sides of the worm axis. These grooves produce additional mulling action similar to that of a uniroll mill. In Fig. 7 the extrusion member comprises a removable wear plate 29' secured by screws 30. In Fig. 9 the extrusion plate 31 is provided with grooves 31 which increase the pressure on the parts being mulled in the grooves.

The above construction possesses several valuable advantages over previously known two worm mixers. The present machine, for example, has four points of extrusion, one at each end of the two worms which results in twice the mixing action per unit of vessel volume that is obtained by the prior construction which has but two points of extrusion one of which is at one end of one worm and the other of which is at the opposite end of the companion worm. The mixing action and material cycle of the present machine is different from that found in other two worm mixers and is also considerably more rapid. As compared to the simple horizontal cycle consisting of a circuit from one end of one worm to the same point by travel of the material along the length of the worms in opposite directions and its transference from one worm end to the other, the present apparatus provides a combination of horizontal and vertical mixing. Each worm end forces the material toward the adjacent worm end with result that a portion of the impinging material moves vertically.

In addition to the above advantages resulting from the double extrusion action, the fact that the worms can intermesh; and are preferably so mounted, considerably enhances the value of our improved mixer. The intermeshing worms also allow use of larger diameter worms for a given volume mixer which results in more vigorous mixing action. The double spiral worms of this invention have the further advantage of increased extrusion and internal balancing of stresses in the machine. This feature is particularly effective with lower viscosity pastes because with very stiff bases the double spiral causes more material to stick to the worms.

As many apparently widely different embodiments of this invention may be made without departing from the spirit and scope thereof, it is to be understood that we do not limit ourselves to the specific embodiments thereof except as defined in the appended claim.

We claim:

Apparatus adapted for the mixing of viscous mixtures which comprises a vessel, companion worms rotatable in said vessel, and an extrusion plate which is spaced a short distance from the ends of said worms and against which the material being mixed is wiped from one end of one worm toward the end of the adjacent worm, each worm having two oppositely pitched spirals which have their origins intermediate the worm ends and which lead therefrom toward said extrusion plates, the spiral of each worm during rotation thereof extending within the spaces between the adjacent spiral on the companion worm, the worm spirals adjacent each other on companion worms being of opposite pitch, and means for rotating said worms toward each other.

MAURICE V. HITT.
GORDON R. McCORMICK.